UNITED STATES PATENT OFFICE.

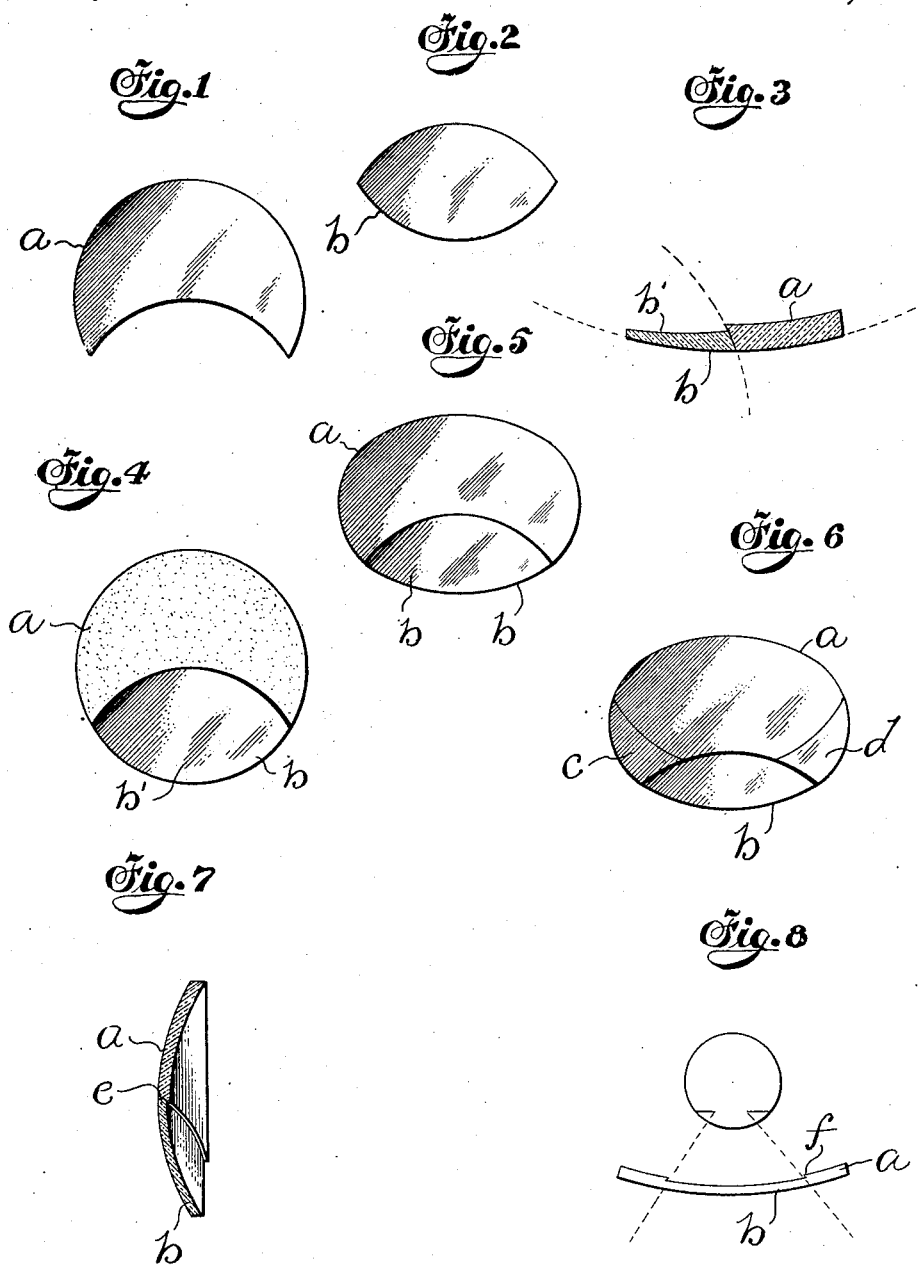

ANDREW JAY CROSS, OF NEW YORK, N. Y.

MULTIFOCAL OPHTHALMIC LENS.

1,360,727.              Specification of Letters Patent.    Patented Nov. 30, 1920.

Application filed September 13, 1918, Serial No. 253,851. Renewed September 30, 1920. Serial No. 413,892.

*To all whom it may concern:*

Be it known that I, ANDREW JAY CROSS, a citizen of the United States, and a resident of the city, county, and State of New York, have invented a new and useful Improvement in Multifocal Ophthalmic Lenses, of which the following is a full, clear, and exact description.

My invention relates to improvements in multifocal ophthalmic lenses, and the general objects of my invention are to produce a simple easily made and satisfactory multifocal lens having the far, near, and intermediate focal areas grouped around an approximately common principal axis or optical center; to arrange the surface areas so that the lens areas of intermediate powers do not get in the way of the vision when not needed; to produce a lens having trifocal powers at least with sharp visual fields as distinguished from the bifocal having two such fields; to construct the lens so that cement troubles will be obviated in its manufacture and there will be less visibility of the union of the two members of the lens; to construct the lens so that it can be easily finished in ordinary shops, and in general to produce a lens easier to make and more satisfactory to use than the lenses of this character as heretofore constructed.

Owing to improvements in design and manufacture bifocal lenses have become almost as popular as mono-focal types, but trifocal and quadrifocal lenses have not yet gained popular favor, owing partly to the location of optical centers and to the confusion caused by the different focal lenticular areas being placed in a vertical plane, which necessarily limits a wearer's visual fields to too narrow a scope. With my improved arrangements, however, the two surface areas most generally used are arranged in a vertical plane, while the others, as illustrated, two other similar surface areas, are placed in positions lateral to the first two, one on each side, and with the principal axes of the lateral two coördinated approximately with the principal axes of the first two, causing the principal axes of all of the focal powers to be approximately the same. In other words, the various focal areas of the lens are grouped in a generally circular way around an approximately common center. I have also made improvements in fusing and grinding. As generally carried out, the fusing of lenses is either for surface fusing or a combination of surface and edge fusing, and it is generally done with glass of different densities or indexes of refraction, and such glasses are usually ground or finished on an unbroken surface after the fusing has been done, whereas in my case I have one surface, usually that of the close vision member, finished before fusing, and I obtain an uneven surface and a decreased fusion zone, and thereby a lessened amount of possible aberration due to faulty union. I also am enabled, as will hereinafter appear, to obtain abrupt steplike focal changes between two of the powers, because of previously finished surfaces, and because of location of the principal axes. Then too in my lens I arrange for peripheral focal powers to be so placed, and of such dioptral strength, that a wearer by turning the eyes to either side may obtain binocular focal adjustment of a given power.

Another important feature in the method of construction of my new lens lies in the permissible arrangement of two or more of the principal axes of its focal powers, whereby not only focal strength, but so-called optical centers can be controlled as necessity dictates, for in other types of lenses in which all external lenticular surfaces are ground after the fusing takes place, independent centering cannot be readily accomplished. All of which will more clearly appear from the description which follows.

Reference is to be had to the accompanying drawings forming a part of this specification, in which similar reference characters indicate corresponding parts in all the views.

Figure 1 is a view of the major lens blank with a segment removed, this corresponding usually to the major lens member and distance vision glass.

Fig. 2 is a detail of the close vision member which is adapted to fit in the cut-away portion of Fig. 1.

Fig. 3 is a cross section through the united members shown in Figs. 1 and 2.

Fig. 4 is a view of the major and minor lens members after fusion.

Fig. 5 is a view of the finished lens as for bifocal construction.

Fig. 6 is a detail view with intermediate lens areas ground thereon.

Fig. 7 is a cross section through the finished lens, and

Fig. 8 is a diagrammatic view showing the relation of union of the two lens members to the eye of the wearer.

In my construction the major lens member $a$, which is usually ground for distance vision, and the close vision member $b$, are made of glass having the same index of refraction. At the point of union $e$ the meeting edges of the members $a$ and $b$ are ground with surfaces of revolution, and curve in two directions on long and short lines as shown in Fig. 7, and as shown by dotted lines in Fig. 3, the two curves being at angles to each other. The inner surface $b^1$ of the member $b$ is finished before it is united to the member $a$, and this it will be noticed gives one lenticular surface area of a given power, and the others can be ground so as to have a certain relation to this, thereby facilitating the fixing of the relative strength of the other lenticular areas. It will be noticed structurally, too, that where the members $a$ and $b$ are united as in Fig. 3, there is a substantial overhang of the member $a$ with reference to the member $b$, so that the inner surface of the member $a$ can be ground as desired without interfering with the surface of the member $b$, and when finished, this overhang will be slight. Moreover, by reason of the peculiar curves at the union of these two members, the junction and the slight ledge of the overhang will coincide with the ordinary vision, as shown diagrammatically in Fig. 8, and thus visibility of the union is very much lessened. Furthermore, by shaping the meeting parts of the members $a$ and $b$ as described, I get a most excellent fit, so that the parts fuse very readily and firmly, and at the same time without making a joint which is likely to cause aberration of vision.

After the members $a$ and $b$ have been united by fusing, the integral member thus formed is finished exteriorly to a smooth even surface, and interiorly it is provided with lens areas of intermediate power as shown at $c$ and $d$, these being located at the sides of the principal axes of the lens, and they are ground so that their optical centers or principal axes approximately coincide with those of the members $a$ and $b$. Thus for ordinary purposes the lens will act like the usual bi-focal lens, and the vision is directed through the member $a$ or $b$, but if intermediate vision is desired, one can simply turn his head and eye slightly either to right or left and look through the areas $c$ or $d$, thus getting the desired effect. It will be observed that where the eyes are turned as indicated, one eye will look through the zone or area $c$ of one lens while the other eye will look through the corresponding zone or area $c$ of the other lens, and thus a binocular effect is obtained and there is no confusion of vision. No doubt an even finer subdivision of surface areas might be carried out on this principle, but for all practical purposes the tri-focal lens is sufficient, and by having the lens areas arranged as shown, no interference with ordinary vision is noticeable.

It will be noticed at once that this arrangement enables glasses to be adapted to distant vision, near vision, and intermediate vision, or focal adjustments, by a simple movement of the eyes up and down or sidewise, thus obtaining a larger and more useful field of distance vision than by a purely vertical arrangement of focal powers.

It will be noticed particularly that the principal focal axis of the member $b$ may be located up or down and either to right or left of the principal axis of the member $a$ and of the surfaces $c$ and $d$, as one surface of the member $b$ is ground before fusing and is therefore independent of the others. Then, too, as shown in Fig. 6, the principal axis of the intermediate focal areas $c$ and $d$ is located in approximately the same place as the principal axis of the distance and near vision areas $a$ and $b$, thus approximately coordinating the principal axis of all of the focal powers of the lenses, notwithstanding the fact that the surface areas are somewhat widely separated.

I claim:—

1. A multiple focus ophthalmic lens made from a glass blank composed of two members, one thicker than the other, fused together edge to edge, with the thicker member overhanging the thinner member and with the overhanging edge of the thicker member finished prior to fusing, said lens having distance and close vision members one above the other, and with intermediate vision areas at the sides of the lens and partly between the distance and close vision members, the several lenticular areas being approximately cocentric.

2. A multiple focus ophthalmic lens having distance and close vision lenticular areas vertically arranged one above the other, said areas meeting at their middle portions, and the lines of said areas diverging toward the lens ends, and intermediate vision areas occupying the spaces near the lens ends between the said distance and close vision areas, the several lens areas being substantially co-centric.

3. A multiple focus lens formed of a plurality of members fused together edge to edge and having lenticular surface areas of different powers, the lens being ground so that the areas are sharply defined, and with the several foci having areas which are essentially optically cocentric.

4. A monocentric multifocal lens formed of a plurality of members fused together edge to edge, one of said members being thicker than its adjacent member and overhanging the latter, the thinner member having a finished lenticular area thereon, said area being ground before fusing, and the several lenticular areas being approximately optically cocentric.

5. A multiple focus ophthalmic lens consisting of two members fused together edge to edge, one member thicker than the other, with the thicker member overhanging the thinner member, and so ground as to give a plurality of lenticular surface areas on one side of the lens, the surface areas on this side approximately merging near the geometrical center of the lens and causing the completed lens when ground and finished to have only one principal axis common to all the foci.

ANDREW JAY CROSS.

Witnesses:
 WARREN B. HUTCHINSON,
 M. G. O'DONNELL.